United States Patent [19]
Gillespie et al.

[11] Patent Number: 5,536,542
[45] Date of Patent: Jul. 16, 1996

[54] PROCESS FOR LOW TEMPERATURE HEAT SEALING OF POLYETHYLENE

[75] Inventors: Bruce A. Gillespie, Overton; Ray Edwards, Henderson; Bruce W. Foster, Longview, all of Tex.

[73] Assignee: Eastman Chemical Company, Kingsport, Tenn.

[21] Appl. No.: 504,976

[22] Filed: Jul. 20, 1995

[51] Int. Cl.$^6$ .......................... B29C 47/06; B32B 15/08
[52] U.S. Cl. ............... 428/34.3; 428/409; 428/411.1; 428/500; 428/511; 215/12.2; 156/244.11; 156/244.23; 156/244.24; 156/244.27; 206/524.3
[58] Field of Search .................. 428/411.1, 409, 428/500, 349, 218, 516, 517, 34.3, 511; 156/244.11, 244.23, 244.24, 244.27; 524/77; 427/278; 523/100; 215/12.2; 206/524.3

[56] References Cited

U.S. PATENT DOCUMENTS

| | | | |
|---|---|---|---|
| 3,875,128 | 4/1975 | Suzuki et al. | 260/80.7 |
| 5,268,230 | 12/1993 | Edwards et al. | 428/409 |
| 5,350,476 | 9/1994 | Edwards et al. | 156/244.1 |

OTHER PUBLICATIONS

*Polyethylene* by Renfrew and Morgan, at pp. 11–17.

Petroleum Refiner (1956) by Thomasson, McKetta and Ponder, p. 191.

*Primary Examiner*—Charles R. Nold
*Attorney, Agent, or Firm*—Mark A. Montgomery; Harry J. Gwinnell

[57] ABSTRACT

A process of producing a heat sealed extrusion coated polyethylene article is disclosed. This process entails heat sealing, at a temperature below 95° C. two opposing extrusion coated polyethylene laminate surfaces thereby welding the surfaces to effect a heat seal. The polyethylene has a narrow molecular weight distribution, a low melt index, a low swell ratio, and a polydispersity index below 5.

16 Claims, No Drawings

5,536,542

PROCESS FOR LOW TEMPERATURE HEAT SEALING OF POLYETHYLENE

FIELD OF THE INVENTION

The present invention relates to a process for heat sealing extrusion coated polyethylene laminates. More particularly, the present invention relates to a low temperature process of forming a heat sealed extrusion coated polyethylene article with desirable properties.

BACKGROUND OF THE INVENTION

Various polyethylenes are used throughout industry in many applications including the production of extrusion coated polyethylene laminates. Extrusion coated polyethylene laminates have many varied useful applications. One particular application for extrusion coated polyethylene laminates is in the formation of packaging articles. The extrusion coated polyethylene laminate is formed into a packaging article by bending and heat sealing extrusion coated polyethylene laminate sheets to form an enclosure. The heat seal is made by forming a molten polyethylene interface between two adjacent surfaces of the bent extrusion coated polyethylene laminate sheet followed by cooling to form a single solid polyethylene layer between two surfaces of the substrate. The resulting enclosure or container is used to package various products.

Polyethylenes used in forming these extrusion coated polyethylene laminates of medium to high density (i.e. at or above 0.925-g/cc annealed density) provide laminates and the resulting packages with very good barrier properties, low coefficients of friction, and good scuff resistance. Packages with good barrier properties retain the freshness of packaged food stuffs, while retaining moisture content. Polyethylene extrusion coated laminates with low coefficients of friction are able to be formed into packages at high processing speeds without sticking to adjacent laminates. Packages with good scuff resistance retain their good aesthetics with reduced printing ink smearing, or surface scuffing. Although these extrusion coated polyethylene laminates using a medium to high density polyethylene have desirable characteristics, they require a high temperature heat sealing process (above 95° C.). When an extrusion coated polyethylene laminate is heat sealed at high temperatures, the polyethylene is oxidized or degraded to a certain extent (at higher temperatures of longer heat exposures the effect is more pronounced). The degraded or oxidized residues of the polyethylene migrate into the food stuffs contained in the packages giving rise to undesirable odors and taste for the consumer.

Low density polyethylenes (below 0,925-g/cc, more so below 0.92-g/cc) are able to be heat sealed when formed as an extrusion coated polyethylene laminate at temperatures below 95° C. At these temperatures polyethylene does not have a tendency to oxidize or degrade to any significant extent. This permits the formation of packages for food stuffs that don't have undesirable tastes or odors. However, when these low density polyethylenes are formed into extrusion coated polyethylene laminates, the laminates do not have good barrier properties, low coefficients of friction, or good scuff resistance.

It would be very desirable to be able to produce extrusion coated polyethylene laminates that can be heat sealed at low temperatures, avoiding the oxidation and degradation that results in undesirable tastes and smell and be formed into packages that maintain good barrier properties, low coefficients friction, and good scuff resistance.

SUMMARY OF THE INVENTION

The polyethylene heat sealing process according to the present invention comprises; heating at a temperature below 95° C. two opposing extrusion coated polyethylene laminate surfaces to melt the polyethylene on each laminate surface welding said polyethylene surfaces together to effect a heat seal, wherein said polyethylene of such laminate surface is a polyethylene of narrow molecular weight distribution having a melt index of 1 to 4 dg/min. at 190° C., a swell ratio of 1.2 to 1.3, an annealed density of no greater than 0.93 g/cc and a polydispersity index of less than 5.

The present invention also comprises heat sealed articles containing the above polyethylene.

DETAILED DESCRIPTION OF THE INVENTION

The applicants have unexpectedly discovered a low temperature heat sealing process that produces heat sealed articles with excellent properties. The process employs a polyethylene composition that is able to be extrusion coated on substrates forming an extrusion coated polyethylene laminate. The polyethylene composition permits the extrusion coated polyethylene laminate to be heat sealed at temperatures below 95° C. but yet the resulting heat sealed article maintains good barrier properties, low coefficients of friction, and good scuff resistance. Since the article is heat sealed at low temperatures the degradation or oxidation of the polyethylene, caused by higher temperatures, does not occur. This process produces very desirable consumer packages.

The polyethylene used in the process of the present invention has a narrow molecular weight distribution (narrow MWD) as reflected in the polydispersity index below 5. The polydispersity index defined herein after is preferably 1 to 4, more preferably 2 to 4, with a polydispersity index of 3 to 3.5 being most preferred. A polydispersity index much above 5 does not produce a polyethylene that provides a good heat seal at temperatures below 95° C.

As defined herein a good heat seal is one that is capable of withstanding a separation force of no less than about 150 grams per linear inch (2.54 cm) when peeled at a separation rate of 30-millimeters per minute. This separation force is preferably at least 200 more preferably about 500 to 1000 grams per linear inch.

The process according to the present invention forms a laminate structure with a good heat seal, as defined above. Generally, the laminate structure with a good heat seal having the above heat seal strength i.e. separation force is destroyed upon separation. This means that a destructive bond has been formed and, when the substrate is paper, the polyethylene-paper interface has been delaminated tearing the paper.

The polyethylene of the present invention has a melt index of 1 to 4-dg/min at 190° C. as defined herein after. The polyethylene preferably has a melt index of 1.5 to 3-dg/min, with a melt index of 2 to 2.5-dg/min at 190° C. being most preferred. A polyethylene having a melt index much above 4 or much below 1, in combination with the other polyethylene characteristics essential to extrusion coatability, would not permit the polyethylene to be extrusion coatable.

The polyethylene of the present invention has a swell ratio of about 1.2 to 1.3, as defined herein after. The swell ratio of the polyethylene is more preferably about 1.25 to 1.27, with a swell ratio of about 1.26 being most preferred. A polyethylene with a swell ratio that falls much above 1.3 or much below 1.2 in combination with the other polyethylene characteristics essential to extrusion coatability is not extrusion coatable.

The polyethylene of the present invention preferably has an annealed density of 0.92 to 0.93-g/cc as defined herein after. The low density polyethylene of the present invention more preferably has an annealed density of 0.925 to 0.927-g/cc, with an annealed density of 0.926-g/cc being most preferred. Polyethylenes having a density much above 0.93-g/cc have been discovered not to be heat sealable at temperatures below 95° C. The annealed density of the polyethylene is preferably not much lower than 0.92-g/cc since polyethylenes with densities much below 0.92-g/cc tend to exhibit high coefficients of friction which cause processing problems during carton converting operations.

The polyethylene of the present invention is preferably a polyethylene homopolymer, however, minor amounts of other comonomers such as propylene can be present. The amount of comonomer is preferably less than 5 mole percent. The polyethylene of the present invention can also be blended with minor amounts of other polymers preferably not over 5 wt. % so as not to detract from the heat sealing properties.

Examples of suitable polyethylene materials useful in the practice of the present invention can be prepared by polymerizing relatively high purity ethylene in a stirred reactor at pressures above 1,000 atmospheres and temperatures above about 200° C., using a peroxide-type catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the text Polyethylene by Renfrew and Morgan, at pp. 11–17 and the article in Petroleum Refiner (1956) by Thomasson, McKetta and Ponder, found at p. 191.

The processes to make the preferred polyethylenes of the present invention of the defined narrow molecular weight distribution (low polydispersity index) at the desired melt index are known using a relatively cooler average reactor temperature in a high pressure autoclave.

It is well known among practitioners of high pressure, autoclave polyethylene synthesis technology that use of a cooler average reactor temperature produces a polymer with less polydispersity (lower PDI). This phenomenon results from phase relationships influenced by both pressure and temperature, and more particularly, by such phase relationships in the initial portion of a zoned reactor or the initial reactor in a train of reactors operated in series. Typically, this synthesis technology is applied to polyethylenes used in film applications since the lower PDI polymers tend to have enhanced optical characteristics compared to higher PDI polymers.

This technology is further disclosed in U.S. Pat. No. 3,875,128, "Process and Apparatus for Producing Ethylene Polymer," by Suzuki et al., who disclosed the use of cooler reactor temperatures wherein the authors claim the use of cooler reactor temperatures to achieve enhanced optical properties. These enhanced optical properties are due to the lower PDI of the polyethylenes resulting from the cooler reactor temperatures.

The process according to the present invention entails heat sealing an extrusion coated polyethylene to itself. The method of applying heat to effect the seal can be either by transmission through the substrate; hot air; or radiation.

The extrusion coated polyethylene used in the heat sealing process according to the present invention is preferably extruded at a temperature greater than 280° C., more preferably between 290° and 330° C., with a temperature between about 300° and 310° C. being most preferred. Extrudate temperatures within this range are important to enable extrusion coating of the present invention with good adhesion to the substrate.

Polyethylenes of the present invention can contain certain additives to lower the seal initiation temperature during heat sealing. Suitable additives include natural and synthetic tackifying resins such as those of the pinene and limonene families. Levels of these additives are preferably less than about 10.0 wt. %.

Other additives, such as minor amounts of stabilizers, fillers and the like can be added to the composition of the present invention. Such materials can be present in the polyethylene composition or added just prior to the extrusion coating process.

Substrates contemplated for use in the practice of the present invention include papers, paperboards, polymeric materials, metal foils, and the like. Polymeric substrates include polyolefins or functionally modified polyolefins, polyesters or functionally modified polyesters, polyethylene-vinyl alcohol copolymers or functionally modified derivatives thereof, polyamides or functionally modified polyamides, and the like including embossed and/or oriented polymeric substrates with and without microvoiding agents/pigments such as titanium dioxide, barium sulfate, and calcium carbonate. However, the preferred substrate of the present invention are papers, including kraft paper and paperboard.

Extruder output rates of the extrusion coating process are not critical to the present invention as is the heat sealing output rates. Additionally, the speeds of the extrusion coating process and heat sealing process are not critical but slower speeds are commercially undesirable.

The temperature of the heat sealing process of the present invention is below 95° C. At this temperature the polyethylene is not degraded or oxidized and therefore degraded or oxidized polyethylene material such as polyethylene oligomers are not present in the polyethylene of the heat sealed article. The heat sealing process is preferably conducted at a temperature below 93° C., more preferably at a temperature no greater than 90° C. with a temperature no greater than about 85° C. being most preferred. As long as the polyethylene is able to melt and form a heat seal, the lower temperatures are preferred due to lower oxidation or degradation of the polyethylene. At temperatures at and above 95° C., polyethylene degrades and oxidizes making the heat sealed article less desirable for contact with food stuffs. Time is less of an important feature and the heating time to produce the heat seal should not be extremely long since some degradation will occur even at lower temperatures. The heat time at which the polyethylene is at or above its melting point is less than 3.0 seconds, more preferably less than 0.5 seconds.

The process of joining the two extrusion coated polyethylene laminate surfaces together is not critical. However, two alternative methods are available. In one method, two opposing extrusion coated polyethylene laminate surfaces are clamped together and then heat sealed by heat transmission through the substrate to the polyethylene laminate interface surfaces that is in between the respective substrates. Once the polyethylene is melted it forms a single layer of welded polyethylene between the two substrates and is then cooled. Another method of heat sealing the extrusion coated polyethylene laminate surfaces entails heating each surface at or above the melting point of the polyethylene and then subsequently bringing the two surfaces into contact with each other thereby forming a weld to effect the heat seal that forms one layer of polyethylene between the two respective substrates. On cooling the heat sealed article the single layer of polyethylene is sufficiently strong and adhered to the polyethylene that it forms a destructive bond between the two substrates. This means that attempts to separate the two substrates destroys one or the other substrate.

The heat sealed article or package produced according to the present invention does not contain a high amount of degraded polyethylene. This results in a package that does not have an undesirable odor or does not provide aftertaste to foodstuffs packaged therein. The amount of degraded polyolefin present in the heat sealed article is less than 1.0 weight percent based on the total weight of the polyethylene between the two laminates. This amount is preferably less than 0.5 weight percent. Suitable articles include folded substrates coated on both sides with polyethylene. The examples include folded cartons for containing liquids such as milk cartons.

The process of heat sealing including detailed techniques required to achieve the high heat sealing at low temperatures and other variations of the present invention will be apparent to one of ordinary skill reading the present disclosure.

EXAMPLES

Experimental

In the examples the properties are determined as follows:

Melt index was determined in accordance with ASTM D1238-62T at 190° C.

Swell ratio is defined as the ratio of the diameter of the extrudate over that of the orifice diameter of the extrusion plastometer in ASTM Designation D1238-62T. The diameter of the specimen is measured in the area between 0.159 cm and 0.952 cm of the initial portion of the specimen as it emerges from the extrusion plastometer. Measurements are made by standard methods according to ASTM Designation D-374.

Annealed density was determined in accordance with ASTM D1505.

The weight-average molecular weight, Mw, number-average molecular weight, Mn, and polydispersity index, Mw/Mn, were obtained by size-exclusion chromatography on a Waters 150° C. gel permeation chromatograph equipped with the standard refractometer detector and a Viscotek 150R differential viscometer system. The 3-column set consisted of Waters' $10^3$, $10^4$, and $10^5$ high temperature columns. The samples were run as 0.1% (wt/vol) solutions in o-dichlorobenzene at 140° C. The data was interpreted using Viscotek Unical software (v4.02), by universal calibration using narrow polystyrene standards supplied by American Polymer Standards Corp., of Mentor, Ohio, USA. The melting point was determined by differential scanning calorimetry (DSC).

Data for each of the following examples were obtained by, first extrusion coating each polyethylene onto 40 lb. natural kraft paper using a metal chill roll, rotating with a surface speed of 150 meters per minute to form an extrusion coated polyethylene laminate. At this speed the polyethylene was coated to a thickness of 1 mil (about 25 microns). Each polyethylene was extruded at a molten temperature of 595°–600° F. (about 310°–320° C.) and at an output rate of 10-lb/hr/inch of die width (1.8 kg/hr/cm). After extrusion coating each polyethylene coated substrate was tested on a Theller heat sealer, Model HT in which the two identical polyethylene laminates are clamped together and then heated. Heat sealed strength was then determined as a function of sealing temperature.

Example 1 (Comparative)

An extrusion coating grade polyethylene homopolymer, obtained as a sample from Eastman Chemical Company (ECC), having a 2.5-dg/min melt index, a swell ratio of 1.70, an annealed density of 0.918-g/cc, and a polydispersity index of 6.5 was extrusion coated and heat sealed as above using the Theller heat sealer that heats by transmission of heat through the substrate to the polyethylene interface surface. The heat sealing initiation temperature was 85° C. Properties are further illustrated below in Table 1.

Example 2 (Comparative)

An extrusion coating grade polyethylene homopolymer, available from ECC under the trademark TENITE 1550P, having a 3.5-dg/min melt index, a swell ratio of 1.73, an annealed density of 0.918-g/cc, and a polydispersity index of 6.1 was extrusion coated and heat sealed as indicated above. The resulting heat sealing initiation temperature was 85° C. (50 grams per 2.54 cm heat seal strength) with an optimum heat seal at 88° C. (200 grams per 2.54 cm heat sealed strength). See Table 1 for properties.

Example 3 (Comparative)

An extrusion coating grade polyethylene homopolymer, obtained as a sample from ECC, having a 4.5-dg/min melt flow index, a swell ratio of 1.70, an annealed density of 0.926, and a polydispersity index of 9.2 was extrusion coated and heat sealed as indicated above. The resulting heat sealing initiation temperature was 93° C. (50 grams per 2.54 cm heat seal strength) with an optimum heat seal at 95° C. (200 grams per 2.54 cm heat seal strength). See Table 1 for properties.

Example 4 (Comparative)

An extrusion coating grade polyethylene homopolymer, obtained as a sample from ECC, having a 5 dg/min melt index, a swell ratio of 1.70, an annealed density of 0.930-g/cc, and a polydispersity index of 5.0 was extrusion coated and heat sealed as indicated above. The resulting heat sealing initiation temperature was 95° C. (50 grams per 2.54 cm heat seal strength) with an optimum heat seal at 102° C. (200 grams per 2.54 cm heat seal strength). See Table 1 for properties.

Example 5 (Comparative)

An extrusion coating grade polyethylene homopolymer, obtained as a sample from ECC, having a 6.0-dg/min melt index, a swell ratio of 1.67, an annealed density of 0.935-g/cc, and a polydispersity index of 9.8 was extrusion coated and heat sealed as indicated above. The resulting heat sealing initiation temperature was 99° C. (50 grams per 2.54 cm heat seal strength) and 106° C. (200 grams per 2.54 cm heat seal strength). See Table 1 for properties.

Example 6 (Comparative)

An extrusion coating grade polyethylene homopolymer available from ECC under the trademark TENITE polyethylene M-3011P having a 10--dg/min melt index, a swell ratio of 1.65, an annealed density of 0.945-g/cc, and a polydispersity index of 13.6 was extrusion coated and heat sealed as indicated above. The resulting heat sealing initiation temperature was 109° C. (50 grams per 2.54 cm heat seal strength) and 116° C. (200 grams per 2.54 cm heat seal strength). See Table 1 for properties.

Example 7

An extrusion coating grade polyethylene homopolymer from ECC under the trademark TENITE polyethylene 1810F having a 1.7 dg/min melt index, a swell ratio of 1.28, and annealed density of 0.926-g/cc, and a polydispersity index of 3.0 was extrusion coated and heat sealed as indicated above. The resulting heat sealing initiation temperature was 85° C. (50 grams per 2.54 cm heat seal strength) and 89° C. (200 grams per 2.54 cm heat seal strength). See Table 1 for properties.

Example 8

An extrusion coating grade polyethylene homopolymer available from ECC under the trademark TENITE POLYETHYLENE 1840F having a 2.5-dg/min melt index, a swell ratio of 1.30, an annealed density of 0.926-g/cc, and a polydispersity index of 3.1 was extrusion coated and heat sealed as indicated above. The resulting heat seal initiation temperature was 85° C. (50 grams per 2.54 cm heat seal strength) and 89° C. (200 grams per 2.54 cm heat seal strength). See Table 1 for properties.

These examples clearly indicate that the polyethylene used in the process according to the present invention from Examples 7 and 8 clearly produce an unexpectedly low heat sealing initiation temperature equivalent to that of the low density polyethylenes, Examples 1 and 2. The heat sealing initiation temperature of Examples 7 and 8 are unexpected based on polymer density or melting point.

surfaces together to effect a heat seal, wherein said polyethylene of each laminate surface is a polyethylene of narrow molecular weight distribution having a melt index of 1 to 4 dg/min. at 190° C., a swell ratio of 1.2 to 1.3, an annealed density of no greater than 0.93 g/cc, and a polydispersity index of less than 5.

2. The process according to claim 1 wherein said polyethylene has a melt index of 1.5 to 3 dg/min., a swell ratio of 1.25 to 1.27, and a annealed density of 0.925 to 0.927 g/cc, and a polydispersity index of 1 to 4.

3. The process according to claim 2 wherein said polyethylene has a melt index of 2 to 2.5 dg/min., a swell ratio of 1.26, and a annealed density of 0.926 g/cc and a polydispersity index of 3 to 3.5.

4. The process according to claim 1 wherein the polyethylene heat sealing process is conducted at a temperature below 93° C.

5. The process according to claim 1 wherein the polyethylene heat sealing process is conducted at a temperature no greater than 90° C.

6. The process according to claim 5 wherein the polyethylene heat sealing process is conducted at a temperature no greater than 85° C.

7. The process according to claim 1 wherein said two opposing extrusion coated polyethylene laminate surfaces are clamped together and then heat sealed by heat transmission thru the substrate to the polyethylene laminate interface surfaces thereby forming a single layer of polyethylene between two substrates.

8. The process according to claim 1 wherein said extrusion coated polyethylene laminate surfaces are heated at or above the melting point of the polyethylene and then subsequently brought into contact with each other thereby welding to effect a heat seal forming one layer of polyethylene between two substrates.

9. The process according to claim 1 wherein the polyethylene of the extrusion coated polyethylene laminate surfaces is applied to a substrate by extrusion coating at a temperature between 290° C. and 330° C.

10. The process according to claim 1 wherein the polyethylene of the extrusion coated polyethylene laminate surface is applied to both surfaces of a substrate and said two opposing extrusion coated polyethylene laminate surfaces are different surfaces of the same substrate.

11. An article of manufacture comprising the heat sealed article produced according to the process of claim 1.

TABLE 1

| Poly-ETHYLENE | MI dg/min | Swell Ratio | Density | Polydispersity Index | Melting Point (DSC) | Heat Sealing Initiation Temperature, OC. |
|---|---|---|---|---|---|---|
| Ex. 1 | 2.5 | 1.70 | 0.918 | 6.5 | 106.9 | 85 |
| Ex. 2 | 3.5 | 1.69 | 0.918 | 6.2 | 106.7 | 85 |
| Ex. 3 | 4.5 | 1.70 | 0.926 | 9.2 | 109.1 | 93 |
| Ex. 4 | 5.0 | 1.70 | 0.930 | 5.0 | 110.3 | 95 |
| Ex. 5 | 6.0 | 1.67 | 0.935 | 9.8 | 111.7 | 99 |
| Ex. 6 | 10.0 | 1.65 | 0.945 | 13.6 | 115.3 | 109 |
| Ex. 7 | 1.7 | 1.28 | 0.926 | 3.0 | 110.9 | 85 |
| Ex. 8 | 2.5 | 1.30 | 0.926 | 3.1 | 111.0 | 85 |

We claim:

1. A polyethylene heat sealing process comprising; heating at a temperature below 95° C. two opposing extrusion coated polyethylene laminate surfaces to melt the polyethylene on each laminate surface welding said polyethylene 12. The article of manufacture of claim 11 wherein said extrusion coated polyethylene surfaces that have been welded to effect a heat seal forming a destructive bond.

13. An article of manufacture comprising a heat sealed extrusion coated polyethylene laminate structure of polyethylene between two substrate surfaces, wherein said polyethylene is a polyethylene of narrow molecular weight distribution having a melt index of 1 to 4 dg/min at 190° C., a swell ratio of 1.2 to 1.3, an annealed density of no greater than 0.93 g/cc, and a polydispersity index of less than 5.

14. The article of manufacture according to claim 13 wherein the two substrate surfaces are different parts of the same substrate.

15. The article of manufacture according to claim 14 wherein the two substrate surfaces are outer opposing edges of the same substrate folded to contact each other and the article is a package.

16. An article of manufacture according to claim 15 wherein the article is a polyethylene extrusion coated paper carton for containing liquids.

* * * * *